(12) United States Patent
Macchietto

(10) Patent No.: US 6,833,505 B1
(45) Date of Patent: Dec. 21, 2004

(54) HANDHOLE COVER

(75) Inventor: Carl J. Macchietto, Omaha, NE (US)

(73) Assignee: Valmont Industries, Inc., Valley, NE (US)

( * ) Notice: Subject to any disclaimer, the term of this patent is extended or adjusted under 35 U.S.C. 154(b) by 0 days.

(21) Appl. No.: 10/869,011

(22) Filed: Jun. 16, 2004

(51) Int. Cl.[7] .............................................. H02G 3/14
(52) U.S. Cl. ...................... 174/66; 174/45 R; 174/38; 220/241; 52/220.1
(58) Field of Search ................................ 174/66, 45 R, 174/38; 220/241, 3.8; 138/92; 52/220.1

(56) References Cited

U.S. PATENT DOCUMENTS

| | | | | |
|---|---|---|---|---|
| 3,343,322 A | * | 9/1967 | Alexander et al. ............ | 52/298 |
| 3,755,977 A | * | 9/1973 | Lewis ............................. | 52/98 |
| 4,914,258 A | * | 4/1990 | Jackson ..................... | 174/45 R |
| 5,099,087 A | * | 3/1992 | Barrell ......................... | 174/66 |
| 5,641,939 A | * | 6/1997 | Tourigny ................... | 174/45 R |
| 6,150,609 A | * | 11/2000 | Baldwin ....................... | 174/66 |
| 6,204,446 B1 | * | 3/2001 | Parduhn ................... | 174/45 R |
| 6,608,253 B1 | * | 8/2003 | Rintz .......................... | 174/66 |

* cited by examiner

*Primary Examiner*—Dhiru R. Patel
(74) *Attorney, Agent, or Firm*—Thomte, Mazour & Niebergall; Dennis L. Thomte

(57) ABSTRACT

A handhole cover for a utility pole includes a cover plate having a pivotal latch bar positioned inwardly therefrom. A rotatable bolt interconnects the cover plate and the latch bar in such a way so that the clockwise rotation of the bolt, during installation, will cause the latch bar to move from a vertically disposed position to a horizontally disposed position. Further counterclockwise rotation of the bolt will draw the latch bar into engagement with the inner end of a lip positioned in the access opening. The design of the invention not only permits easy installation of the cover plate over the access opening of the utility pole, but also permits easy removal of the cover plate from the access opening. The design also deters theft and vandalism.

8 Claims, 11 Drawing Sheets

HANDHOLE COVER

BACKGROUND OF THE INVENTION

1. Field of the Invention

This invention relates to a handhole cover and particularly to a handhole cover for a utility pole. More particularly, this invention relates to a handhole cover which is easily installed on the utility pole to cover the handhole and which deters theft or vandalism.

2. Description of the Related Art

Utility poles such as highway, signal, street lighting poles, etc., are normally positioned on a concrete foundation which has an electrical conduit provided therein which contains electrical wires running therethrough. The electrical wires continue to the top of the pole where the lighting fixture is located. Normally, the utility poles are provided with an access opening or handhole spaced above the foundation which is large enough so that an electrician can reach therein to attach the wires in the concrete foundation to the wires extending upwardly through the pole to the light fixture.

Many types of handhole covers have been previously provided in an attempt to provide a handhole cover which is easily and quickly secured to the utility pole or removed therefrom. A problem exists in that vandals and thieves may remove the same. Thus it is desirable to provide a cover for a handhole in a utility pole which is not only easy to install but which deters the theft or vandalism thereof.

SUMMARY OF THE INVENTION

A handhole cover is provided for a utility pole in which the handhole or access opening of the utility pole has a width, a height which is greater than the width, and a peripheral lip positioned in the opening which has inner and outer ends. The apparatus of this invention generally comprises a flat cover plate having a size greater than the peripheral lip so as to extend across the outer end of the lip. The cover plate includes a front surface, a back surface and a central opening formed therein. The back surface of the cover plate has an inwardly projecting shoulder or rib which is adapted to be received within the outer end of the peripheral lip. The cover plate has a centrally disposed, hollow, generally C-shaped first barrel extending inwardly from the back surface thereof with the first barrel having spaced-apart side wall portions which define a gap therebetween which is approximately 90° in the preferred embodiment. An elongated latch bar, having opposite ends, an outer end and an inner end is also provided with the latch bar having a centrally disposed cylindrical second barrel extending outwardly from the outer surface thereof which is receivable in the first barrel of the cover plate. The latch bar has a centrally disposed, internally threaded opening which registers with the central opening in the cover plate. The second barrel of the latch bar has a shoulder or web protruding radially outwardly therefrom which is received by the gap of the first barrel. A bolt extends through the central opening in the cover plate, through the first barrel, and is threadably received by the internally threaded opening of the second barrel of the latch bar. In the preferred embodiment, an elongated coil spring, having inner and outer ends, embraces the bolt between the flat cover and the outer end of the barrel of the latch bar. The inner end of the coil spring is in frictional engagement with the outer end of the second barrel of the latch bar whereby rotational movement of the bolt will normally cause the latch bar to be rotated with the bolt.

The cover of this invention is mounted on the handhole of the utility pole by first positioning the latch bar in a generally vertically disposed position so that the latch bar may be inserted through the peripheral lip so that the ends of the latch bar are initially disposed inwardly of the inner end of the peripheral lip. The bolt is then threadably rotated in a clockwise position with the frictional engagement of the spring against the outer end of the second barrel of the latch bar causing the latch bar to rotate 90° with the bolt until the web of the latch bar engages one of the side wall portions of the first barrel which ensures that the latch bar will be maintained in a horizontally disposed position so as to extend across the width of the inner end of the lip. Continued rotation of the threaded bolt in a clockwise position causes the latch bar to be moved outwardly towards the cover plate until the ends of the latch bar engage the inner ends of the peripheral lip.

The cover is easily and quickly installed on the utility pole and is easily removed therefrom providing the person has a screwdriver, Allen wrench or other tamper-resistant tool (hereinafter "tool"). Normally, vandals or thieves will not have a tool of the type described readily available, so theft and vandalism is deterred.

When it is desired to remove the cover, the tool is brought into engagement with the outer end of the threaded bolt and is rotated in a counterclockwise direction. The latch bar will initially not be rotated upon rotation of the bolt since the ends of the latch bar are in engagement with the inner end of the peripheral lip. When the bolt has been sufficiently loosened so that the latch bar can move out of engagement with the inner end of the peripheral lip, the latch bar will rotate with the bolt until the web engages the other side wall of the first barrel on the cover plate so that the latch bar will be held in a vertically disposed relationship with respect to the handhole. The entire assembly may then be removed from the utility pole.

It is therefore a principal object of the invention to provide an improved handhole cover.

Still another object of the invention is to provide a handhole cover for a utility pole which is quickly and easily installed on the utility pole and which is quickly and easily removed therefrom providing the person has a screwdriver.

Still another object of the invention is to provide a handhole cover for a utility pole which includes co-acting means to enable the latch bar of the cover to be rotated 90° to facilitate installation and removal.

A further object of the invention is to provide a handhole cover for a utility pole which requires a screwdriver, Allen wrench or other tamper-resistant tool to remove the same from the utility pole which deters theft and vandalism.

Still another object of the invention is to provide an invention of the type described which is easily installed on and removed from the utility pole providing the worker has an Allen wrench, screwdriver or other tamper-resistant tool.

Yet another object of the invention is to provide a handhole cover of the type described wherein means is provided for permitting and limiting the pivotal movement of a latch bar from a vertically disposed position to a horizontally disposed position and vice versa.

A further object of the invention is to provide a handhole cover which deters theft and vandalism.

These and other objects will be apparent to those skilled in the art.

DETAILED DESCRIPTION OF THE INVENTION

Figure 1:
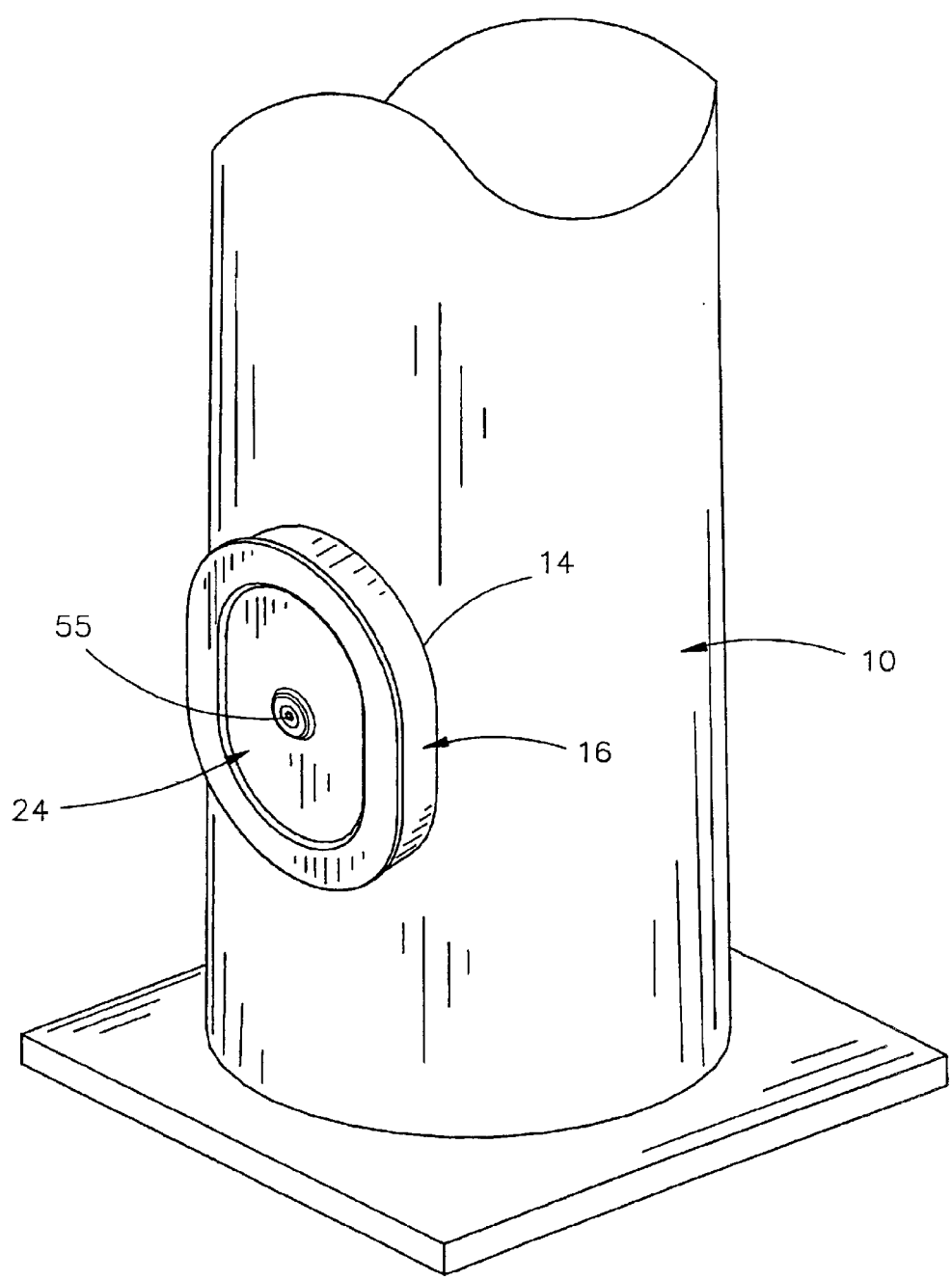
FIG. 1 is a partial perspective view of a utility pole having the handhole cover of this invention mounted thereon.
Figure 2:
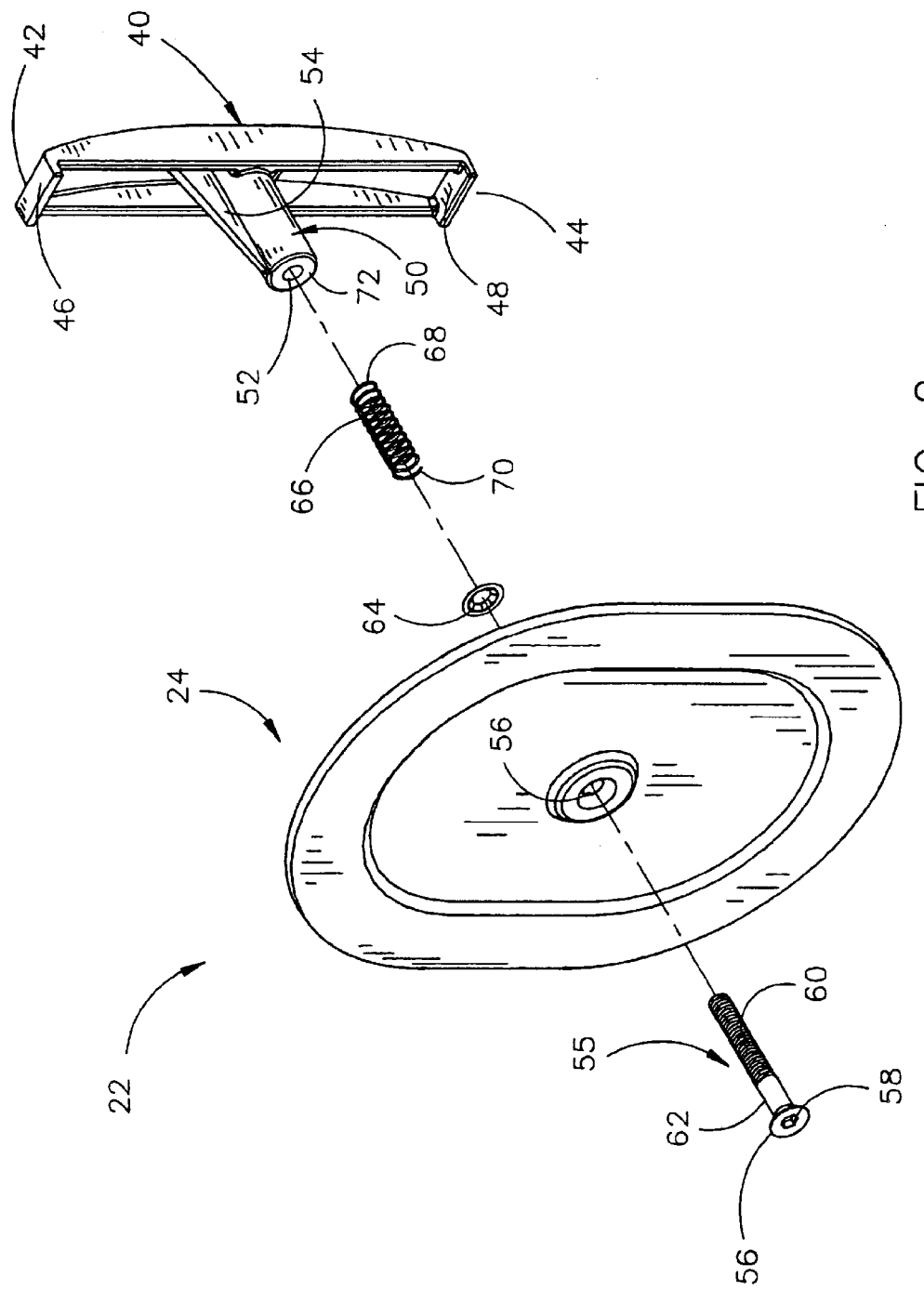
FIG. 2 is an exploded front perspective view of the handhole cover of this invention.
Figure 3:
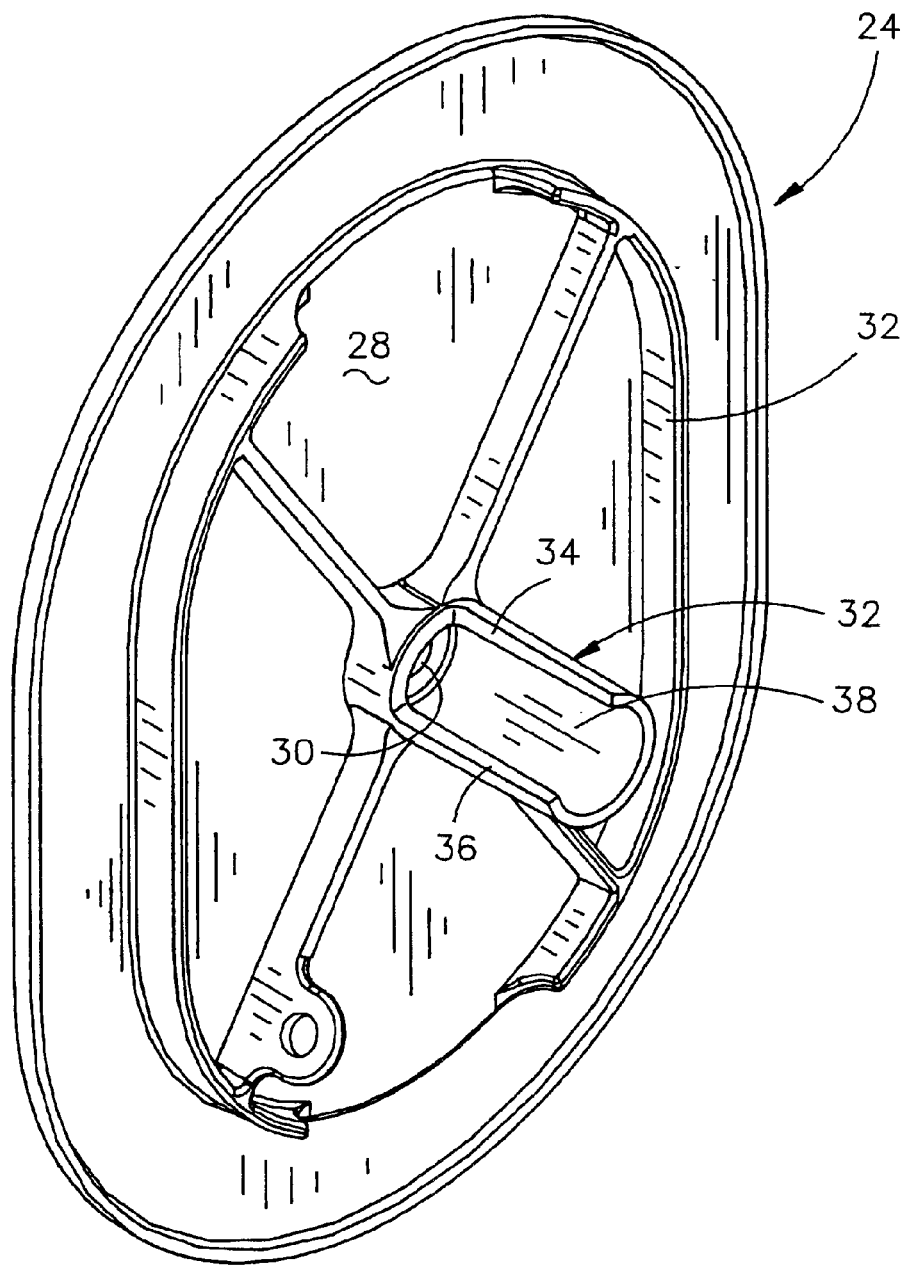
FIG. 3 is a rear perspective view of the generally flat cover.
Figure 6:
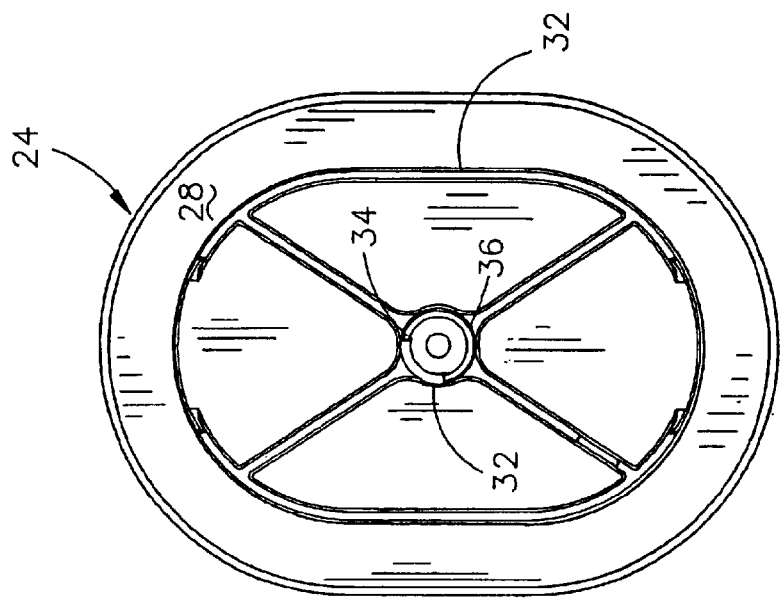
FIG. 6 is a back view of the cover.
Figure 5:
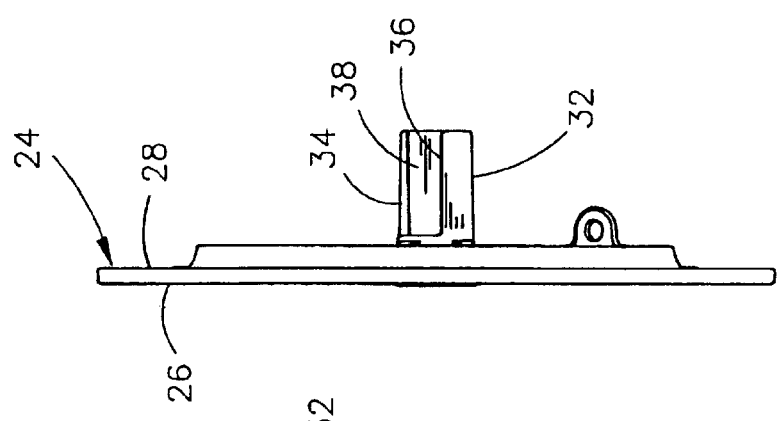
FIG. 5 is a side view of the cover.
Figure 4:
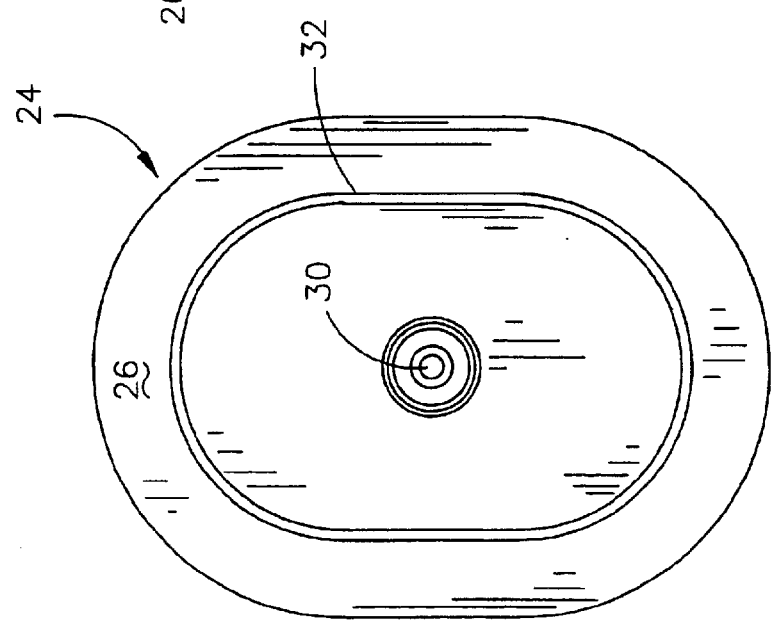
FIG. 4 is a front view of the cover.

In the drawings, the numeral 10 refers to a utility pole or the like which is supported upon a concrete foundation 12 or the like which is normally mounted on a concrete foundation. The concrete foundation 12 normally has a conduit provided therein through which electrical wires extend so that the electrical wires may extend upwardly through the pole 10 to the light fixture or the like mounted on the upper end of the pole 10. In order to connect the wires extending from the foundation 12 to the light fixture or the like at the upper end of the pole 10, an access opening or handhole opening 14 is provided. In most installations, the handhole opening 14 is oval in shape with the width thereof being less than the height thereof. Normally, an oval-shaped peripheral lip or flange 16 is positioned in the handhole 14 which has an inner end 18 and an outer end 20. The flange or lip 16 is normally welded to the pole 10 in conventional fashion.

The handhole cover of this invention is referred to generally by the reference numeral 22, as best seen in the drawings. Cover 22 includes a substantially flat cover plate 24 having an outer end 26 and an inner end 28. Cover plate 24 is generally oval-shaped, as seen in the drawings, and of a size so as to be able to cover the open outer end of the peripheral lip 16. Cover plate 24 includes a beveled central opening 30 formed therein which extends therethrough. Cover plate 24 also includes an inwardly projecting rib 32 which is generally oval in shape and which is adapted to be received within the peripheral lip 16 to prevent rotation of the cover plate 24 during installation and removal thereof from the pole 10.

Cover plate 24 has a generally C-shaped, hollow barrel 32 extending inwardly from the inner end thereof, the interior of which is in communication with the opening 30. Barrel 32 includes spaced-apart side wall portions 34 and 36 which are spaced-apart to define a gap 38 therebetween with the gap being approximately ninety degrees. The gap 38 is preferably 90° but may be less or greater than 90°.

Figure 7:
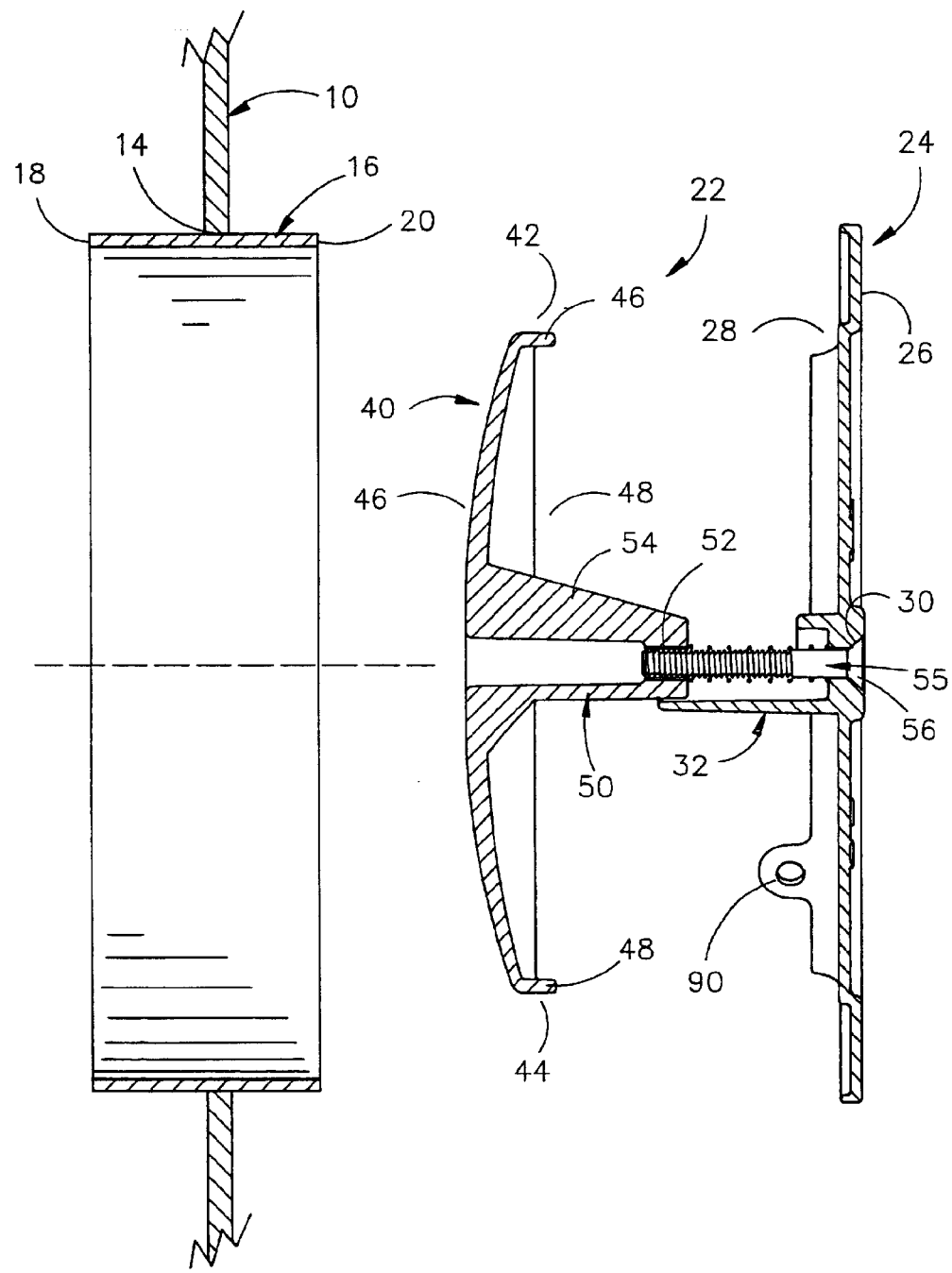
FIG. 7 is a side view illustrating the cover of this invention prior to it being inserted through the access opening in the utility pole.
Figure 8:
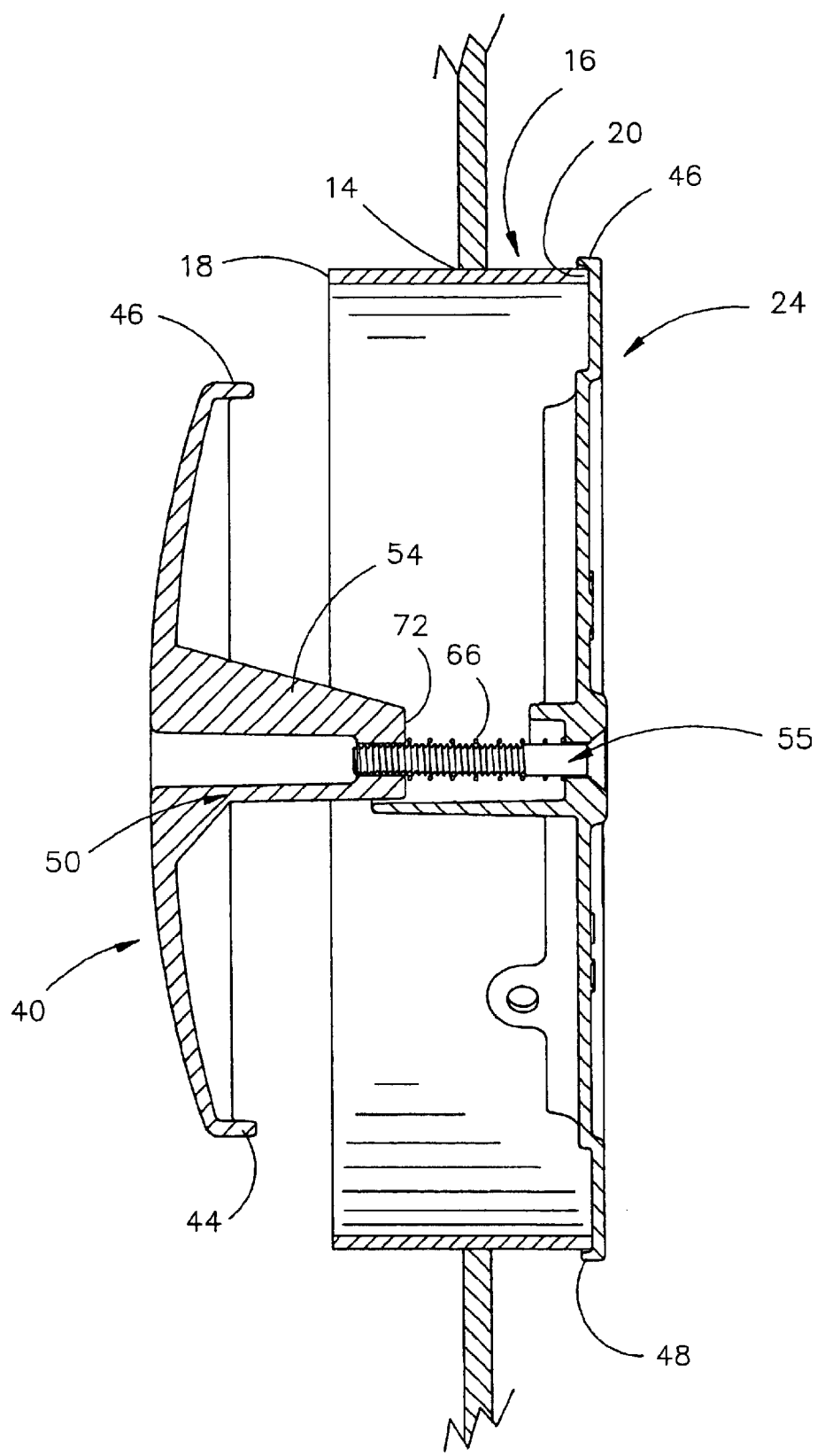
FIG. 8 is view similar to FIG. 7 except that the cover has been positioned in the access opening.
Figure 9:
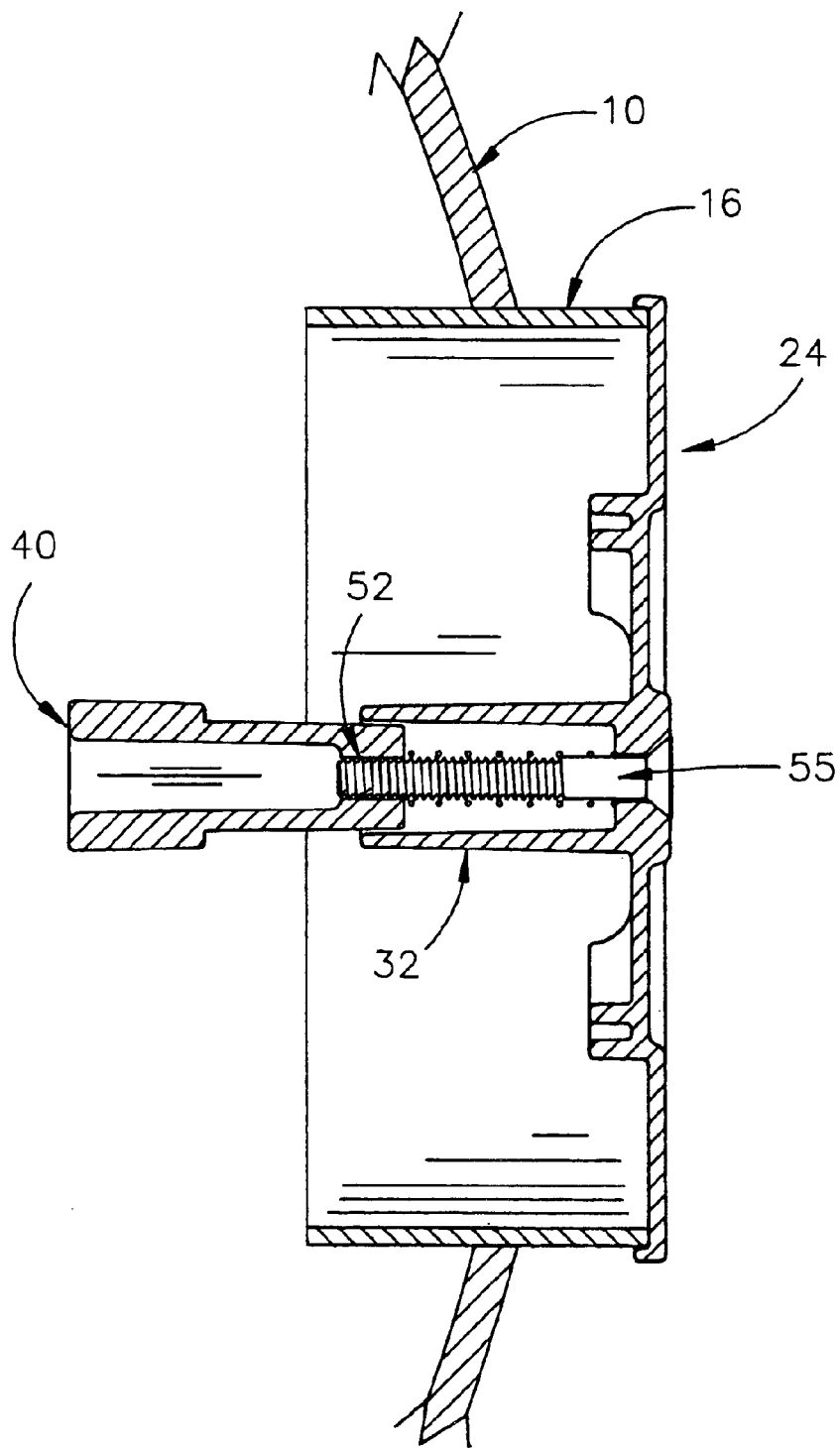
FIG. 9 is a horizontal sectional view illustrating the cover positioned within the access opening.
Figure 10:
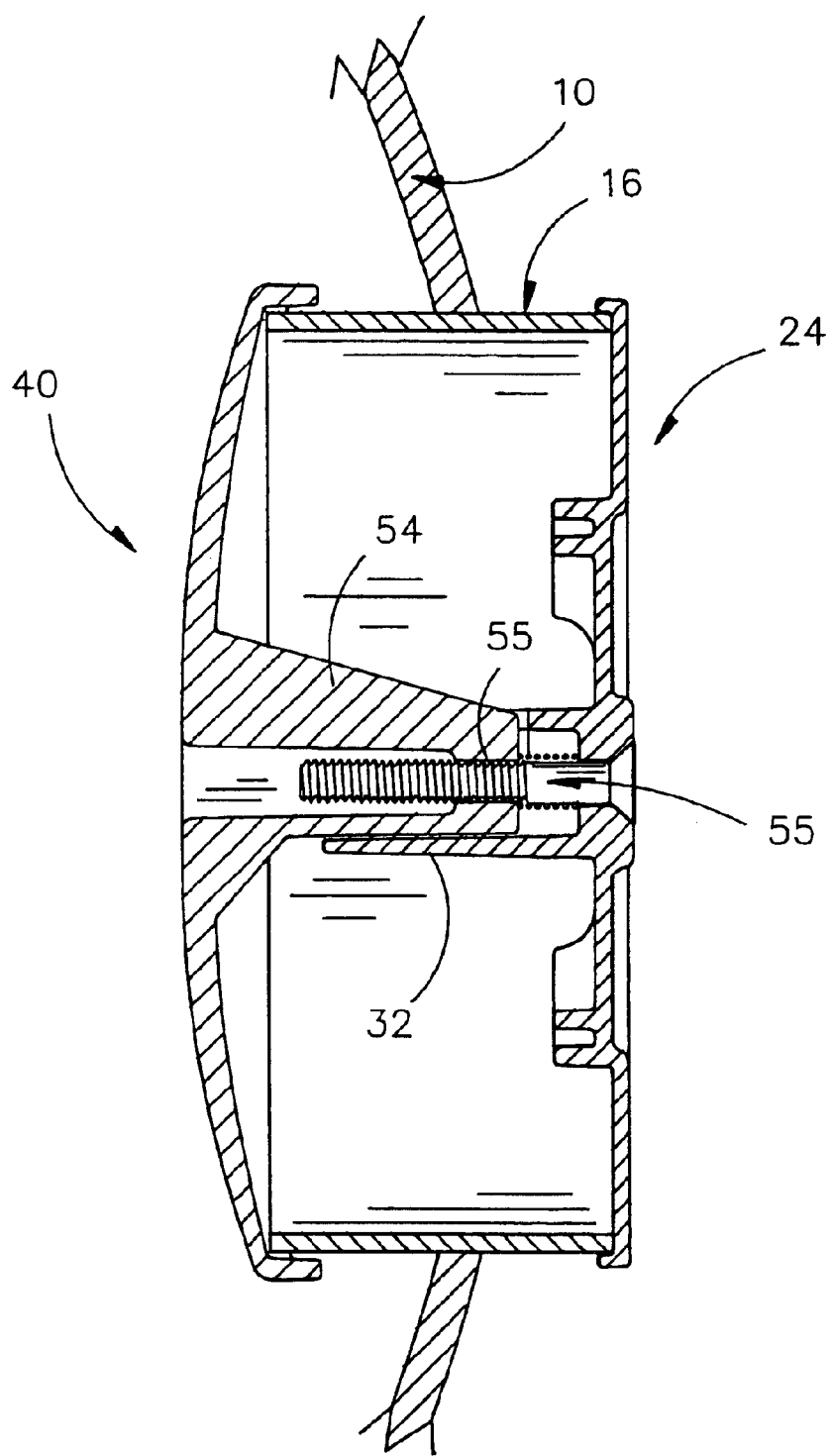
FIG. 10 is a view similar to FIG. 9 except that the latch bar of the cover assembly has been secured to the peripheral lip of the handhole.
Figure 11:
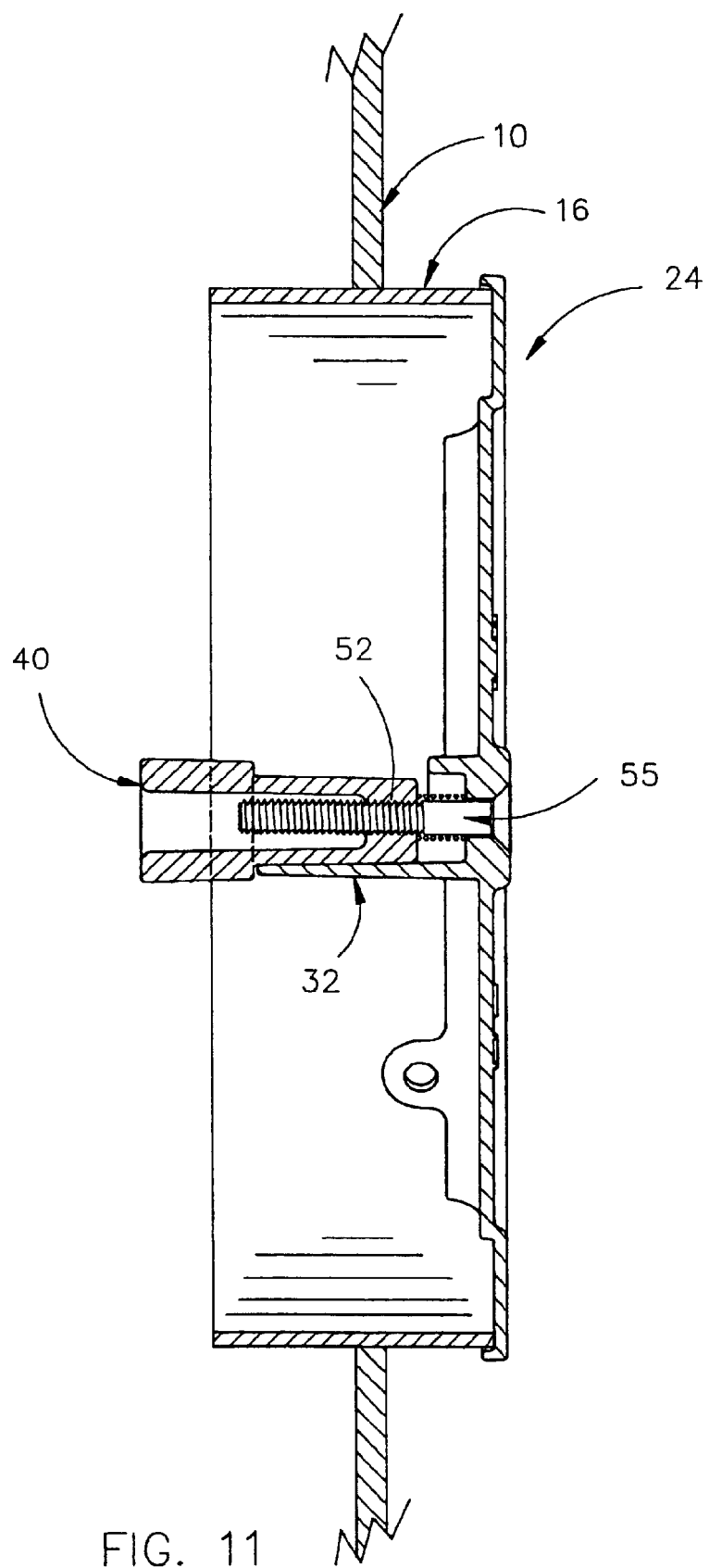
FIG. 11 is a horizontal sectional view illustrating the assembly in the position of FIG. 10.

The numeral 40 refers to an elongated latch bar having opposite ends 42 and 44, inner end 46 and outer end 48. The opposite ends 42 and 44 of latch bar 40 are provided with outwardly extending latch portions 46 and 48, respectively. Latch bar 40 has an outwardly extending barrel 50 which extends outwardly from the outer side 48 thereof and which has an internally threaded opening 52 formed therein. A radially extending shoulder or web 54 is provided on barrel 50 and extends upwardly therefrom when the latch bar 40 is in its vertically disposed position, as illustrated in FIGS. 7 and 8. The numeral 55 refers to a bolt with a beveled head 56 having an Allen wrench opening 58 in the outer end thereof. Bolt 55 includes threaded portion 60 and non-threaded portion 62.

Bolt 55 extends through opening 58 in cover plate 24 and has a push nut fastener or palnut fastener 64 frictionally mounted on non-threaded portion 62 to prevent longitudinal movement of the bolt 55 with respect to cover plate 24. In the preferred embodiment, an elongated coil spring 66 is mounted on bolt 55 inwardly of nut 64 and has an inner end 68 and an outer end 70. The outer end 70 frictionally engages the nut 64 and the inner end 68 of spring 66 frictionally engages the outer end 72 of barrel 50. The threaded portion 60 of bolt 55 is threadably received in the internally threaded opening 52 of barrel 50. When the cover 24 is initially assembled, the web 54 is received within the gap 38 of the barrel 32 and will be positioned adjacent the side wall portion 34 of barrel 32. In that position, the latch bar 40 will be in a vertically disposed position so that the latch bar 40 may be inserted through the oval-shaped opening defined by the peripheral lip 16 and the opening 14. If sufficient friction is created between the threads 60 and the threads of opening 52, rotation of bolt 55 will cause rotation of latch bar 40, thereby eliminating the need for the spring 66. Necessary friction between the threads 60 and the threads of opening 52 may be achieved by many ways such as having "tight" threads or by placing a friction-generating coating on the threads.

Figure 13:
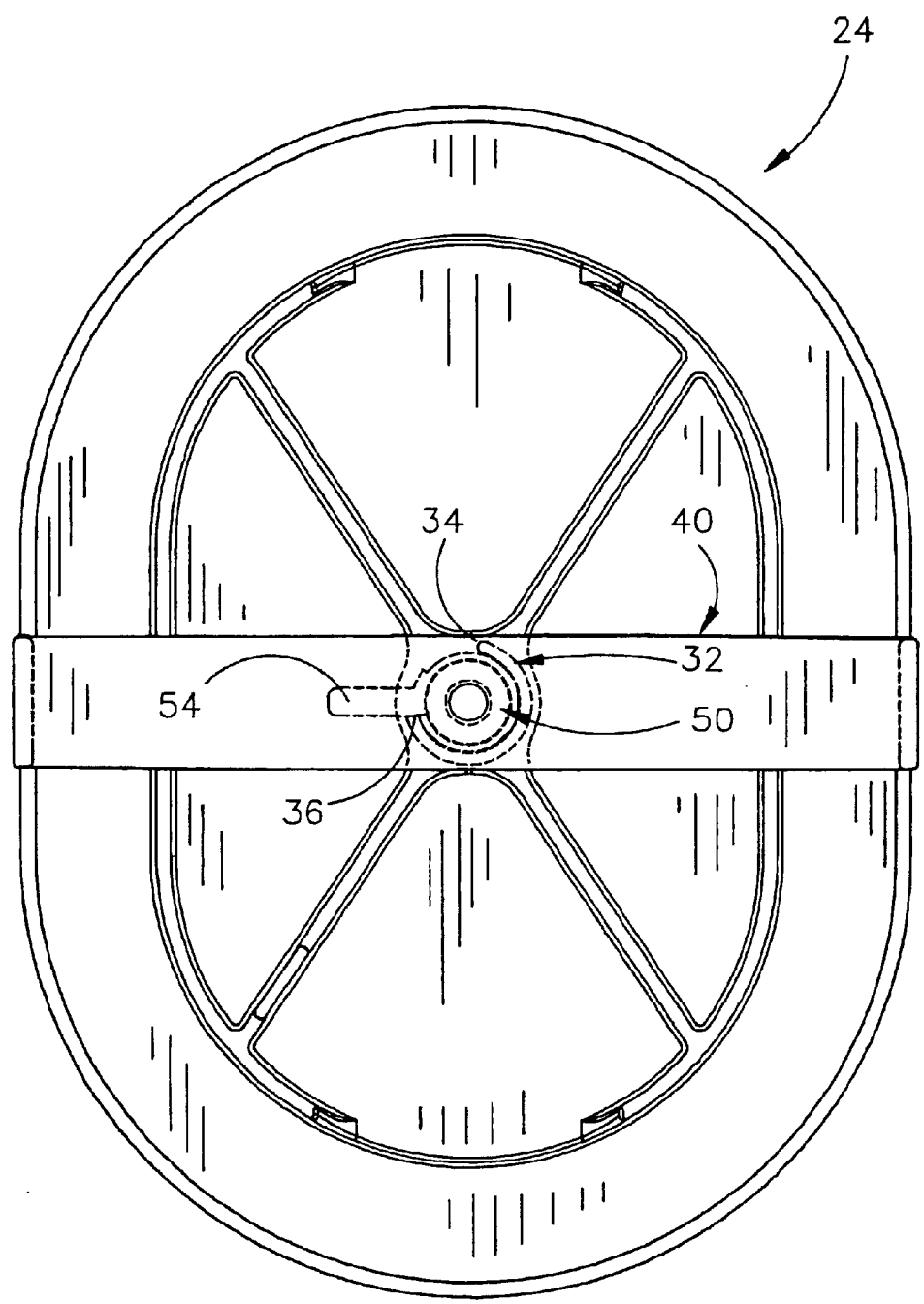
FIG. 13 is a view similar to FIG. 12 except that it illustrates the latch bar in its latched position.

The cover assembly is inserted through the handhole 14, as illustrated in FIGS. 7 and 8, until the cover plate 24 engages the outer end of the peripheral lip 16, as illustrated in FIG. 8, so that the members 46 and 48 are positioned outwardly of the peripheral lip 16. The bolt 55 is then threadably rotated in a clockwise fashion by means of a tool, as previously described, which initially causes the latch bar 40 to be rotated in a clockwise direction therewith due to the frictional engagement of the coil spring 66 against the outer end 72 of the barrel 50. Since the web 54 is positioned in the gap 38, the latch bar 40 will rotate with the bolt 55 until the web 54 engages the side wall portion 36, as illustrated in FIG. 13, which causes the latch bar to be held in the horizontally disposed position. Continued rotation of the bolt 55 in a clockwise direction will cause the latch bar 40 to be moved inwardly with respect to the peripheral lip 16 until the latch bar engages the inner end 18 of the peripheral lip 16.

The numeral 90 refers to an eyelet provided on the inner surface of cover 24 to enable one end of a captive chain to be secured thereto with the other end being secured to the inner surface of the pole to prevent the cover from being lost or stolen once it has been removed from the pole.

When in the installed position, the cover of this invention may only be removed from the utility pole by means of an Allen wrench or a screwdriver. Since many thieves and vandals do not have Allen wrenches or screwdrivers in their possession, the design of this invention deters theft and vandalism.

Figure 12:
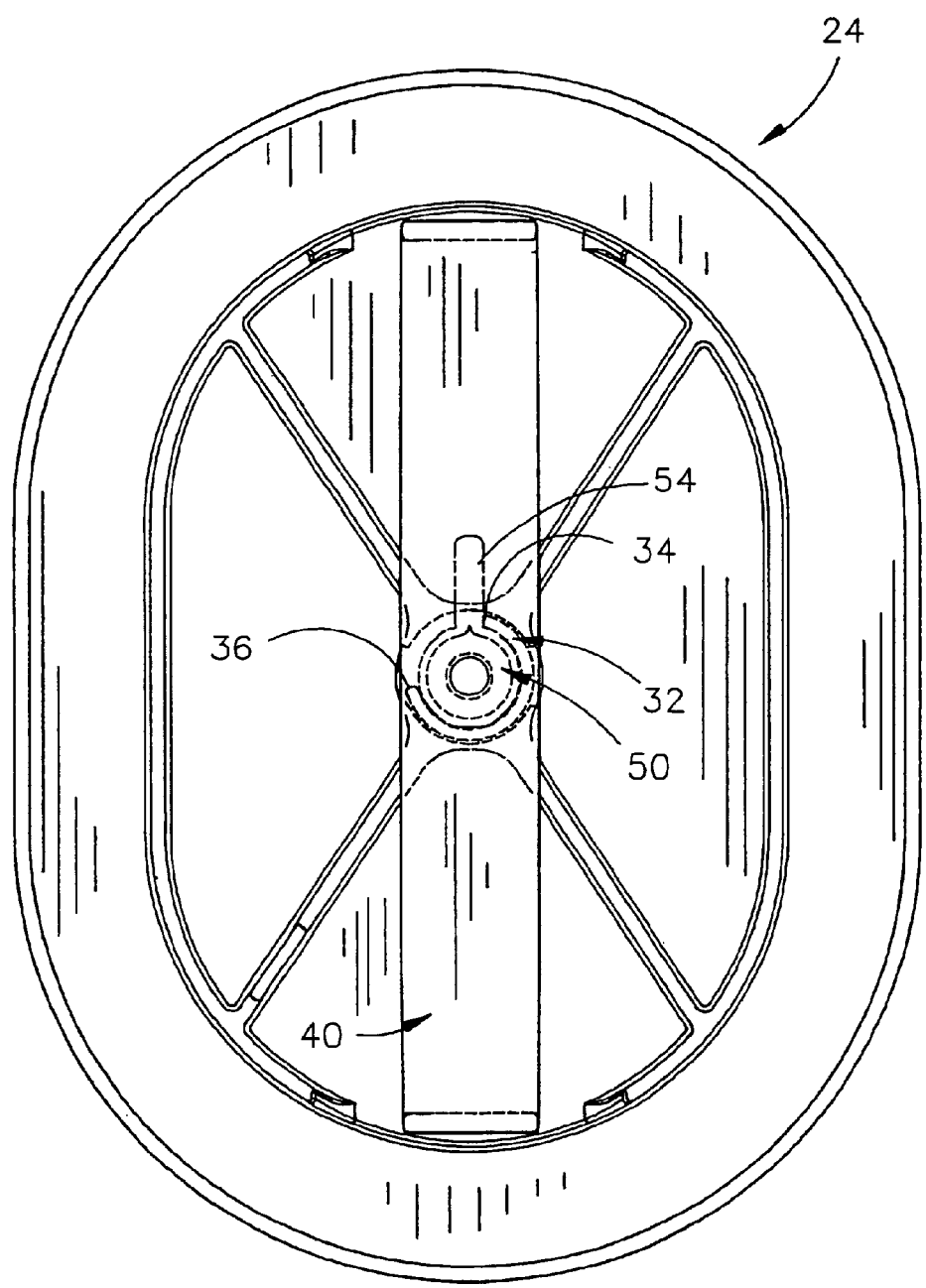
FIG. 12 is a rear elevational view of the cover illustrating the relationship of the barrels of the cover plate and latch bar as the cover assembly is being positioned within the handhole.

When if is desired to remove the cover from the access opening, an Allen wrench or a screwdriver is inserted into the outer end of the bolt 55 and the bolt 55 is rotated in a counterclockwise direction. Initially, the latch bar 40 will not rotate since it is in engagement with the inner end 18 of the lip 16. When sufficient clearance has been provided by the rotation of the bolt 55, the latch bar 40 will rotate with the bolt 55 due to the frictional engagement of the spring 66 and the outer end 72 of the barrel 50. The latch bar 50 will rotate with the bolt 55 in a counterclockwise direction from the position illustrated in FIG. 12 to the position illustrated in FIG. 13 at which time the web or shoulder 54 engages the wall portion 36 which restricts further rotational movement of the latch bar 40. When the latch bar 40 is in the position of FIG. 13, the cover of this invention may be removed from the access opening 14.

Thus it can be seen that a novel handhole cover has been provided which may be easily installed on a utility pole to selectively close the handhole formed therein.

Thus it can be seen that the invention accomplishes at least all of its stated objectives.

I claim:

1. In combination:

a hollow utility pole having an access opening formed therein in which said access opening has a width, a height which is greater than the width, and a peripheral lip positioned in said access opening and which has inner and outer ends;

a cover plate having a size greater than said peripheral lip so as to extend thereacross;

said cover plate having a front surface and a back surface, and a central opening formed therein;

said cover plate having a centrally disposed, hollow, first barrel extending inwardly from the back surface thereof;

said first barrel having spaced-apart side wall portions which define a gap therebetween;

an elongated latch bar having opposite ends, an outer side and an inner side;

said latch bar having a centrally disposed second barrel, having an outer end, extending outwardly from said outer side thereof which is rotatably receivable in said first barrel;

said second barrel having an internally threaded opening formed therein;

said second barrel having a shoulder protruding radially therefrom which is received by said gap of said first barrel;

a bolt extending through said central opening in said cover plate, through said first barrel, and into said threaded opening in said second barrel;

an elongated coil spring, having inner and outer ends, embracing said bolt between said cover plate and said outer end of said second barrel;

said inner end of said coil spring being in frictional engagement with said outer end of said second barrel whereby rotational movement of said bolt will normally cause said latch bar to be rotated with said bolt;

the engagement of said shoulder of said second barrel with said spaced-apart side wall portions limiting the rotation of said latch bar with respect to said cover plate.

2. The combination of claim 1 wherein said first barrel is generally C-shaped.

3. The combination of claim 2 wherein said side wall portions define approximately a 90° gap therebetween.

4. The combination of claim 1 wherein the back surface of said cover plate has a captive chain eyelet provided thereon.

5. In combination:

a hollow utility pole having an access opening formed therein in which said access opening has a width, a height which is greater than the width, and a peripheral lip positioned in said access opening and which has inner and outer ends;

a cover plate having a size greater than said peripheral lip so as to extend thereacross;

said cover plate having a front surface and a back surface, and a central opening formed therein;

said cover plate having a centrally disposed, hollow, first barrel extending inwardly from the back surface thereof;

said first barrel having spaced-apart side wall portions which define a gap therebetween;

an elongated latch bar having opposite ends, an outer side and an inner side;

said latch bar having a centrally disposed second barrel, having an outer end, extending outwardly from said outer side thereof which is rotatably receivable in said first barrel;

said second barrel having an internally threaded opening formed therein;

said second barrel having a shoulder protruding radially therefrom which is received by said gap of said first barrel;

a bolt extending through said central opening in said cover plate, through said first barrel, and into said threaded opening in said second barrel;

said bolt being in frictional engagement with said threaded opening in said second barrel whereby rotational movement of said bolt will normally cause said latch bar to be rotated with said bolt;

the engagement of said shoulder of said second barrel with said spaced-apart side wall portions limiting the rotation of said latch bar with respect to said cover plate.

6. The combination of claim 5 wherein said first barrel is generally C-shaped.

7. The combination of claim 6 wherein said side wall portions define approximately a 90° gap there between.

8. The combination of claim 5 wherein the back surface of said cover plate has a captive chain eyelet provided thereon.

* * * * *